US012716555B2

(12) United States Patent
Sternberg

(10) Patent No.: US 12,716,555 B2
(45) Date of Patent: Aug. 25, 2026

(54) METHOD FOR COORDINATING AN EVAPORATION PROCESS OF A MOTOR VEHICLE HAVING A HYDROGEN TANK, AND ASSISTANCE SYSTEM

(71) Applicant: Daimler Truck AG, Leinfelden-Echterdingen (DE)

(72) Inventor: Alexander Sternberg, Gruet (CH)

(73) Assignee: Daimler Truck AG, Leinfelden-Echterdingen (DE)

( * ) Notice: Subject to any disclaimer, the term of this patent is extended or adjusted under 35 U.S.C. 154(b) by 367 days.

(21) Appl. No.: 18/557,510

(22) PCT Filed: Apr. 26, 2022

(86) PCT No.: PCT/EP2022/061091
§ 371 (c)(1),
(2) Date: Oct. 26, 2023

(87) PCT Pub. No.: WO2022/229211
PCT Pub. Date: Nov. 3, 2022

(65) Prior Publication Data

US 2024/0218983 A1 Jul. 4, 2024

(30) Foreign Application Priority Data

Apr. 27, 2021 (DE) ..................... 10 2021 002 211.4

(51) Int. Cl.
*F17C 13/12* (2006.01)

(52) U.S. Cl.
CPC ...... *F17C 13/123* (2013.01); *F17C 2221/012* (2013.01); *F17C 2250/032* (2013.01);
(Continued)

(58) Field of Classification Search
USPC .......................................................... 700/282
See application file for complete search history.

(56) References Cited

U.S. PATENT DOCUMENTS

| | | | |
|---|---|---|---|
| 11,657,635 | B2 | 5/2023 | Singh |
| 2014/0352792 | A1 | 12/2014 | Shim et al. |

(Continued)

FOREIGN PATENT DOCUMENTS

| | | | |
|---|---|---|---|
| CN | 204020602 | U | 12/2014 |
| CN | 105691208 | A | 6/2016 |

(Continued)

OTHER PUBLICATIONS

Merilo et al. “Experimental study of hydrogen release accidents in a vehicle garage”, Science Direct, 2010, p. 2436-2444. (Year: 2010).*

(Continued)

*Primary Examiner* — Hien D Khuu
(74) *Attorney, Agent, or Firm* — Crowell & Moring LLP

(57) ABSTRACT

A method for coordinating an evaporation process of hydrogen from a hydrogen tank of a motor vehicle by an assistance system includes initiating the evaporation process of hydrogen from the hydrogen tank of the motor vehicle into an area surrounding the motor vehicle by an electronic computing device of the assistance system in accordance with a hydrogen pressure in the hydrogen tank. Evaporation information regarding an additional motor vehicle having an additional hydrogen tank is received by a communication device of the assistance system. The evaporation process of hydrogen from the hydrogen tank of the motor vehicle is coordinated in accordance with the evaporation information regarding the additional motor vehicle.

9 Claims, 1 Drawing Sheet

(52) U.S. Cl.
CPC .. *F17C 2250/034* (2013.01); *F17C 2250/036* (2013.01); *F17C 2250/043* (2013.01); *F17C 2250/0452* (2013.01); *F17C 2250/0473* (2013.01); *F17C 2250/0478* (2013.01); *F17C 2260/042* (2013.01); *F17C 2270/0168* (2013.01)

(56) References Cited

U.S. PATENT DOCUMENTS

| | | | | |
|---|---|---|---|---|
| 2016/0171797 | A1 | 6/2016 | Kim et al. | |
| 2018/0209368 | A1 * | 7/2018 | Dudar | B60K 15/03 |
| 2019/0249830 | A1 | 8/2019 | Cho et al. | |
| 2020/0226853 | A1 * | 7/2020 | Ahmed | H04L 9/0618 |
| 2022/0364680 | A1 * | 11/2022 | Sinding | F17C 5/06 |
| 2023/0246455 | A1 * | 8/2023 | Kondo | H02J 3/46<br>307/84 |

FOREIGN PATENT DOCUMENTS

| | | | | |
|---|---|---|---|---|
| CN | 211825821 | U | | 10/2020 |
| CN | 112277649 | A | * | 1/2021 |
| DE | 10 2012 210 137 | A1 | | 12/2013 |
| DE | 10 2014 226 873 | A1 | | 12/2015 |
| DE | 10 2015 206 823 | A1 | | 10/2016 |
| DE | 10 2017 209 580 | A1 | | 12/2018 |
| DE | 10 2020 122 086 | A1 | | 3/2021 |
| JP | 2005-353346 | A | | 12/2005 |
| JP | 2009075829 | A | * | 4/2009 |
| JP | 2012019607 | A | * | 1/2012 |
| KR | 20170108510 | A | * | 9/2017 |
| WO | WO 2006/060633 | A2 | | 6/2006 |

OTHER PUBLICATIONS

Ehrhart et al. "Risk assessment and ventilation modeling for hydrogen releases in vehicle repair garages", Science Direct, 2020, p. 12429-12438. (Year: 2020).*

PCT/EP2022/061091, International Search Report dated Aug. 31, 2022 (Two (2) pages).

German-language German Office Action issued in German application No. 10 2021 002 211.4 dated Sep. 22, 2021 (Four (4) pages).

Chinese-language Office Action issued in Chinese Application No. 202280028680.0 dated May 16, 2025 (6 pages).

English-language International Preliminary Report on Patentability (PCT/IB/373) and Written Opinion (PCT/ISA/237) issued in PCT Application No. PCT/EP2022/061091 dated Oct. 24, 2023 (7 pages).

* cited by examiner

METHOD FOR COORDINATING AN EVAPORATION PROCESS OF A MOTOR VEHICLE HAVING A HYDROGEN TANK, AND ASSISTANCE SYSTEM

BACKGROUND AND SUMMARY OF THE INVENTION

The invention relates to a method for coordinating an evaporation process of a motor vehicle having a hydrogen tank by means of an assistance system. The invention also relates to an assistance system.

It is already known from the prior art that motor vehicles which are operated with hydrogen for example, have filled up with this liquid hydrogen (LH2) and that this evaporates when heated, for example. This can also be relevant for non-liquid hydrogen, for example, as soon as a pressure relief valve is installed inside the hydrogen tank. During evaporation, a concentration of 4 percent of the air mixture with hydrogen must not be exceeded, otherwise the mixture may be ignited by an ignition source. Due to the spread of hydrogen technology in motor vehicles, although individual vehicles can take this requirement into account, if several motor vehicles are close together there is no coordination of evaporation, which means that the 4 percent can be exceeded.

DE 10 2014 226 873 A1 relates to an apparatus and a method for indicating safety of a hydrogen tank when a vehicle fire occurs. The apparatus includes a hydrogen storage tank and a thermal pressure relief device which is mounted within a valve of the hydrogen storage tank. In addition, a controller is configured to detect a flow rate of hydrogen, discharged from the hydrogen storage tank, using a sensor to determine whether the detected flow rate of discharged hydrogen is within a predetermined reference flow rate range. The controller is also configured to transmit a warning signal when the detected flow rate of discharged hydrogen is included within the predetermined flow rate range.

The object of the present invention is to provide a method and an assistance system, by means of which the safety for a motor vehicle and a surrounding area of the motor vehicle can be increased.

One aspect of the invention relates to a method for coordinating an evaporation process of a motor vehicle having a hydrogen tank by means of an assistance system, in which, in accordance with a hydrogen pressure in the hydrogen tank, the evaporation process for discharging hydrogen into an area surrounding the motor vehicle is initiated by means of an electronic computing device of the assistance system.

It is provided that by means of a communication device of the assistance system, evaporation information regarding an additional motor vehicle having an additional hydrogen tank is received and the evaporation process of the hydrogen tank of the motor vehicle is coordinated in accordance with the evaporation information of the additional motor vehicle.

In particular, therefore, a method is presented for coordinating the motor vehicle with the hydrogen tank with respect to the evaporation in order to minimize the risk of ignition. Thus, the safety of motor vehicles with a hydrogen tank, which could produce dangerous ignition mixtures due to uncoordinated evaporation, can be increased. This minimizes the risk, and a method can be implemented to inform all persons in the surrounding area and the vehicle owners about this risk.

It is thus provided, in particular, that the motor vehicle establishes contact with the additional, neighboring motor vehicle via, in particular, a non-wired technology, for example vehicle-to-vehicle (V2V) communication or vehicle-to-infrastructure (V2X) communication. The motor vehicles communicate via the communication device and forward the evaporation information and, if applicable, also data regarding route planning from a fleet management system to the motor vehicle. This can be carried out both from motor vehicle to motor vehicle and coordinated via, for example, a central electronic computing device, which can be a backend server, for example. Based on the calculated position of the motor vehicle and of the additional motor vehicle in relation to each other and at times during the evaporation process, the times are selected in such a way that the time between the evaporation is maximized. If the evaporation is too close together in time, the owners of the vehicles can be informed about the danger via backend communication, for example, and display options on the motor vehicle can be used to warn bystanders or the fire brigade can be informed. This can be used in a similar way to a so-called eCall.

According to one advantageous embodiment, the evaporation information is transmitted by means of a near-field communication between the motor vehicle and the additional motor vehicle. For example, the motor vehicle can communicate directly with the additional motor vehicle via vehicle-to-vehicle communication (V2V communication). Alternatively, it can be provided that, for example, the additional motor vehicle sends the evaporation information via vehicle-to-infrastructure (V2X communication), whereby the infrastructure in turn then also transmits the evaporation information to the motor vehicle via V2X communication. Thus, the communication between the motor vehicle and the additional motor vehicle can be carried out in different ways. As a result, the evaporation information can be reliably transmitted to the motor vehicle.

It is furthermore advantageous if an evaporation time and/or a hydrogen amount of hydrogen and/or the position of the additional motor vehicle and/or a pressure in the additional hydrogen tank and/or a location of an evaporation valve on the additional hydrogen tank is transmitted as evaporation information. In particular, the motor vehicles can communicate with each other via the communication device and in so doing send information regarding their location, the pressure in the hydrogen tank, the amount of hydrogen that has been loaded, the expected evaporation time and the location of the pressure relief valve in the motor vehicle and, if applicable, also data regarding their route planning from a fleet management system. Thus it can be reliably decided whether an evaporation from the hydrogen tank of the motor vehicle can be carried out without, for example, exceeding the 4 percent concentration in the air.

In a further advantageous embodiment, an evaporation amount of hydrogen in the hydrogen tank and/or an evaporation time of the hydrogen in the hydrogen tank are coordinated. For example, can the amount of hydrogen emitted can be adjusted accordingly. In particular, if, for example, the additional motor vehicle has also already initiated an evaporation process, the adjustment of the evaporation amount can prevent a corresponding critical value of hydrogen from being realized in the surrounding area. Furthermore, the evaporation time can be coordinated. If, for example, the additional motor vehicle has already emitted hydrogen, the evaporation time can be delayed as much as possible so that the evaporation of the motor vehicle is carried out at a later point in time in order to prevent a critical amount of hydrogen in the air mixture.

It has proved to be further advantageous if, in addition, the evaporation process is coordinated in accordance with a hydrogen content in the surrounding area of the motor vehicle. For example, the motor vehicle itself or the surrounding area in which the motor vehicle is located can have a corresponding measuring device for measuring the hydrogen content in the surrounding area. If, for example, the critical hydrogen content, for example 4 percent in the ambient air, has already been reached, the evaporation process can be delayed accordingly. This can prevent a critical concentration of hydrogen in the air mixture.

It is likewise advantageous that an environment model of the surrounding area is created by means of the electronic computing device in accordance with evaporation information of the motor vehicle and in accordance with the evaporation information of the additional motor vehicle. In particular, the environment model comprises the evaporation information of all motor vehicles with hydrogen tanks in the surrounding area. In particular, in the environment model of the motor vehicles with the hydrogen tanks, an approximated mixing model based on the location can be performed to calculate the volatilization, in particular should this location be, for example, an open field or a narrow street of houses. The calculation or the determination of the environment model can either be carried out decentrally on all motor vehicles or centrally on a motor vehicle or on a backend. In this way, the appropriate environment model can be created in detail for different surroundings, whereby an excessively high hydrogen content in the surrounding area can be prevented.

In a further advantageous embodiment, a warning device of the assistance system is activated as a function of the coordination of the evaporation process and a warning for the surrounding area is generated by means of the warning device. In particular, devices internal to the motor vehicle can, for example, be used to warn the surroundings. For example, a horn of the motor vehicle or a lighting device of the motor vehicle can be actuated. Furthermore, for example, microphones can be switched on which warn the surroundings, in particular persons in the surroundings, that, for example, a critical value of the hydrogen content is to be found in the air. This can be realized, for example, via a voice message sent via the microphone. Alternatively or in addition, it can be provided that, for example, the warning device is designed centrally and, for example, in the case of a forced evaporation process, which means that the evaporation must be carried out forcibly, for example because of too high a pressure in the hydrogen tank, although the critical value of hydrogen is already present in the air mixture, the surroundings can be warned and, for example, the fire brigade can already be notified that there is critical value here.

The method is in particular a computer-implemented method. In this regard, another aspect of the invention relates to a computer program product comprising program code means which, when processed by an electronic computing device, cause the device to carry out a method according to the preceding aspect. Therefore, the invention also relates to a computer-readable storage medium comprising a computer program product.

Another aspect of the invention relates to an assistance system for coordinating an evaporation process of a motor vehicle having a hydrogen tank, comprising at least one electronic computing device and comprising a communication device, wherein the assistance system is designed to carry out a method according to the preceding aspect. The method is carried out in particular by means of the assistance system.

In an advantageous embodiment of the assistance system, the electronic computing device is external to the motor vehicle and this electronic computing device centrally receives the evaporation information and evaporation information of the motor vehicle and, as a function thereof, the electronic computing device creates an environment model for the surrounding area.

In another advantageous embodiment of the assistance system, the electronic computing device is designed to generate a control signal for a venting device for venting the surrounding area as a function of the environment model that has been created. For example, the corresponding values and/or the environment model and corresponding warning message can be transmitted to the infrastructure, for example a measured value display for an underground garage, a home automation system, or a control or monitoring centre, whereby, for example, an activation, for example of ventilation systems, in particular for reducing the gas concentration of hydrogen, can be carried out. As a result, for example, a plurality of motor vehicles having a hydrogen tank can also be used in the underground garages.

Advantageous embodiments of the method are also to be regarded as advantageous embodiments of the assistance system. The assistance system has substantive features which enable the method or an advantageous embodiment thereof to be carried out.

Further advantages, features and details of the invention will emerge from the following description of preferred exemplary embodiments and on the basis of the drawings. The features and feature combinations mentioned above in the description and the features and feature combinations mentioned below in the description of the figures and/or shown on their own in the figures can be used not only in the respectively specified combination but also in other combinations or in isolation, without departing from the scope of the invention.

DETAILED DESCRIPTION OF THE DRAWINGS

Identical or functionally identical elements are provided with the same reference signs in the figures.

Figure 1:
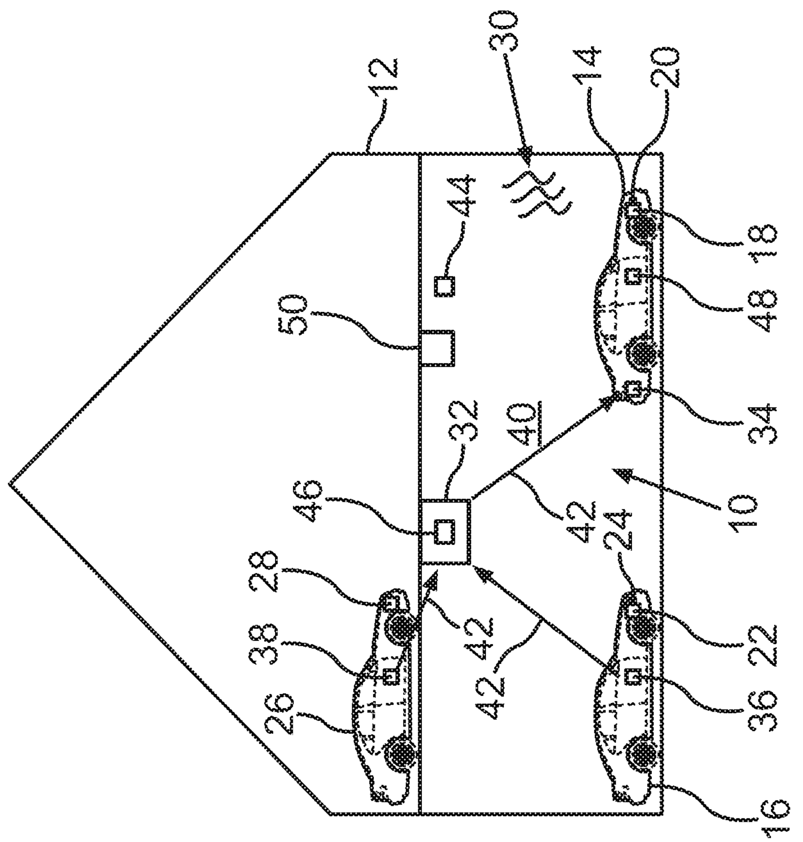
FIG. 1 shows a schematic plan view of an embodiment of an assistance system.

FIG. 1 schematically shows a side view of an embodiment of an assistance system 10. In the present exemplary embodiment, the assistance system 10 is shown in particular in a multi-story car park 12. In this example there are a motor vehicle 14 and an additional motor vehicle 16 and a further additional motor vehicle 26 in the multi-story car park 12. The motor vehicle 14 has a hydrogen tank 18 with an evaporation valve 20. The additional motor vehicle 16 also has an additional hydrogen tank 22 with an additional evaporation valve 24. Furthermore, the further additional motor vehicle 26 has a further additional hydrogen tank 28 auf. The assistance system 10 is designed for coordinating an evaporation process 30 of the motor vehicle 14 having the hydrogen tank 18. For this purpose, the assistance system 10 has at least one electronic computing device 32 which in the present case can be a motor-vehicle-external and central electronic computing device. The assistance system 10 also has at least one communication device 34 which in the present case is in the motor vehicle 14. The additional motor vehicle 16 also has in the present case an additional communication device 36. The further additional motor vehicle 28 has a further additional communication device 38.

In the method for coordinating the evaporation process 30 by means of the assistance system 10, the evaporation process 30 of discharging hydrogen into a surroundings 40, in the present case in particular the multi-story car park 12, of the motor vehicle 14 is initiated by means of the electronic computing device 32 of the assistance system 10 in accordance with a hydrogen pressure in the hydrogen tank 18. It is hereby provided that evaporation information 42 regarding the additional hydrogen tank 22, and in the present case the further additional hydrogen tank 28, is received by means of the communication device 34, and the evaporation process 30 of the hydrogen tank 18 is coordinated in accordance with the evaporation information 42 of the additional motor vehicle 16 and of the further additional motor vehicle 26.

FIG. 1 shows in particular that the additional motor vehicle 16 and the further additional motor vehicle 26 transmit the evaporation information 42 to the central electronic computing device 32. Alternatively or in addition, it can be provided that the additional motor vehicle 16 and the further additional motor vehicle 26 transmit the evaporation information 42 directly to the motor vehicle 14, for example via a vehicle-to-vehicle communication. In particular, however, the communication takes place by means of near-field communication between the motor vehicle 14 and the additional motor vehicle 16.

In particular, an evaporation time and/or a hydrogen amount of hydrogen and/or a position of the additional motor vehicle 16 and/or a pressure in the additional hydrogen tank 22 and/or a location of the evaporation valve 24 on the additional hydrogen tank 22 can be transmitted as evaporation information 42. Furthermore, an evaporation amount of hydrogen in the hydrogen tank 18 and/or an evaporation time of the hydrogen in the hydrogen tank 18 can be coordinated. It can additionally be provided that a hydrogen content in the surrounding area 40 of the motor vehicle 14 is measured by means of a hydrogen sensor 44 for example and the evaporation process 30 is coordinated in accordance with the measured hydrogen content. In the present case, the hydrogen sensor 44 is external to the motor vehicle. It is also possible that the hydrogen sensor 44 is provided internal to the motor vehicle, i.e., in the motor vehicle 14.

It can also be provided that an environment model 46 is created by means of the electronic computing device 32 in accordance with the evaporation information 42 of the motor vehicle 14 and in accordance with the evaporation information 42 of the additional motor vehicle 16.

It can furthermore be provided that a warning device 48 of the assistance system 10, located in the present case inside the motor vehicle 14, is activated in accordance with the coordination the evaporation process 30 and a warning is generated for the surrounding area 40 by means of the warning device 48. Alternatively, the warning device 48 can also be provided by the surrounding area 40, in the present case for example the multi-story car park 12.

It can furthermore be provided that the electronic computing device 32 is designed to generate a control signal for a venting device 50 for venting the surrounding area 40 in accordance with the created environment model 46.

The invention thus proposes in particular that a coordinated temporal and/or spatial distribution of the evaporation processes 30 or of the evaporation amounts is realized, for example by means of a motor vehicle-to-infrastructure communication, with the aim of achieving the lowest possible maximum concentration and/or falling below limit values within the surrounding area 40. For example, the measured values and/or the warning messages can be forwarded to the infrastructure, for example the multi-story car park 12. For this purpose, for example the measured value reading for underground garages, a home automation system, control and monitoring centres can be forwarded, whereby, for example, the venting device 50 can then be activated to reduce the gas concentration. For this purpose, it can be realized, for example, underground garages are released for use by motor vehicles with a hydrogen tank.

Figure 2:
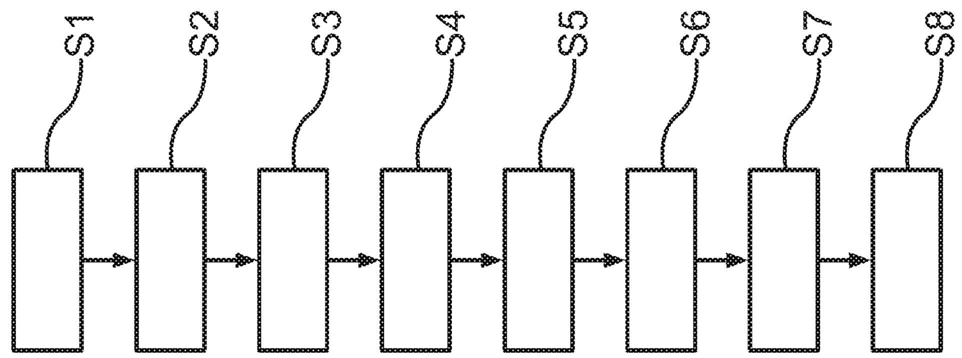
FIG. 2 shows a schematic flow chart according to an embodiment the method.

FIG. 2 shows a schematic flow chart according to an embodiment of the method. In a first step S1, the motor vehicle 14 is parked or in motion, whereby this is stationary for a very long time, for example in a traffic jam. In a second step S2, the motor vehicle 14 establishes direct communication with the additional motor vehicle 16 or, via the motor-vehicle-external electronic computing device 32, with additional motor vehicles 16, 26 in the surrounding area 40. In the third step S3, the data regarding the evaporation process 30 is exchanged. For this, in particular location, pressure of the hydrogen storage tank, amount of hydrogen charged, expected evaporation time, the location of the evaporation valve 20 on the motor vehicle 14, the route planning and the output quantity are communicated. In a fourth step S4, the environment model 46 of the motor vehicle 14, 16, 26 is created. In a fifth step S5, the environment model 46 the motor vehicles 14, 16, 26 is created, wherein in particular an approximated mixing model is also calculated on the basis of the location. For this purpose, the surrounding conditions, such as for example the open field or narrow street of houses, can also be taken into account. In a sixth step S6, the corresponding data from the motor vehicles 14, 16, 26 of the relevant surrounding area 40 is input into the volatilization calculation. In a seventh step S7, the evaporation times are coordinated in accordance with the determined environment model 46 for the motor vehicles 14, 16, 26, wherein the evaporation processes 30 can be determined and assigned accordingly. In an eighth step S8, if the evaporation is too close together in time, the owners of the motor vehicles 14, 16, 26 can be informed of the danger via backend communication, display options on the motor vehicles 14, 16, 26 can be used to warn bystanders and the fire brigade can also be informed, for example. This method can be used in a similar way to a so-called eCall. The environment model 46 can be determined either decentrally on all motor vehicles 14, 16, 26 or centrally, as shown here, in the motor-vehicle-external, central electronic computing device 32.

LIST OF REFERENCE CHARACTERS

10 assistance system
12 multi-story car park
14 motor vehicle
16 additional motor vehicle
18 hydrogen tank
20 evaporation valve
22 additional hydrogen tank
24 additional evaporation valve
26 additional motor vehicle
28 additional hydrogen tank

30 evaporation process
32 electronic computing device
34 communication device
36 additional communication device
38 additional communication device
40 surrounding area
42 evaporation information
44 hydrogen meter
46 environment model
48 warning device
50 venting device
S1 first step
S2 second step
S3 third step
S4 fourth step
S5 fifth step
S6 sixth step
S7 seventh step
S8 eighth step

The invention claimed is:

1. A method for coordinating an evaporation process (30) of hydrogen from a hydrogen tank (18) of a motor vehicle (14) by an assistance system (10), the method comprising the steps of:

initiating the evaporation process (30) of hydrogen from the hydrogen tank (18) of the motor vehicle (14) into an area (40) surrounding the motor vehicle (14) by an electronic computing device (32) of the assistance system (10) in accordance with a hydrogen pressure in the hydrogen tank (18);

receiving evaporation information (42) regarding an additional motor vehicle (16) having an additional hydrogen tank (22) by a communication device (34) of the assistance system (10); and coordinating the evaporation process (30) of hydrogen from the hydrogen tank (18) of the motor vehicle (14) in accordance with the evaporation information (42) regarding the additional motor vehicle (16);

wherein an evaporation time and an amount of hydrogen and a position of the additional motor vehicle (16) and a pressure in the additional hydrogen tank (22) and a location of an evaporation valve (24) on the additional hydrogen tank (22)-comprises are received as the evaporation information (42).

2. The method according to claim 1, wherein the evaporation information (42) is transmitted by a near-field communication between the motor vehicle (14) and the additional motor vehicle (16).

3. The method according to claim 1, wherein an evaporation amount of hydrogen in the hydrogen tank (18) and/or an evaporation time of hydrogen in the hydrogen tank (18) is coordinated.

4. The method according to claim 1, wherein the evaporation process (30) is additionally coordinated in accordance with a hydrogen content in the area (40) surrounding the motor vehicle (14).

5. The method according to claim 1, further comprising the step of creating an environment model (46) of the surrounding area (40) by the electronic computing device (32) in accordance with evaporation information (42) of the motor vehicle (14) and in accordance with the evaporation information (42) of the additional motor vehicle (16).

6. The method according to claim 1, further comprising the steps of activating a warning device (48) of the assistance system (10) as a function of the coordinating and generating a warning for the surrounding area (40) by the warning device (48).

7. An assistance system (10) for coordinating an evaporation process (30) of hydrogen from a hydrogen tank (18) of a motor vehicle (14), comprising:

an electronic computing device (32); and a communication device (34);

wherein the assistance system (10) is configured to perform the method according to claim 1.

8. The assistance system (10) according to claim 7, wherein the electronic computing device (32) is external to the motor vehicle and centrally receives the evaporation information (42) and evaporation information (42) of the motor vehicle (14) and creates an environment model (46) for the surrounding area (40) as a function thereof.

9. The assistance system (10) according to claim 8, wherein the electronic computing device (32) is configured to generate a control signal for a venting device (50) for venting the surrounding area (40) as a function of the environment model (46).

* * * * *